(12) United States Patent
Cheng et al.

(10) Patent No.: US 8,901,210 B2
(45) Date of Patent: Dec. 2, 2014

(54) PLASTICIZER, A BIODEGRADABLE MATERIAL COMPRISING THE PLASTICIZER AND APPLICATION THEREOF

(71) Applicant: Industrial Technology Research Institute, Hsin Chu Hsien (TW)

(72) Inventors: Hsiu-Yu Cheng, Kaohsiung (TW); Guang-Way Jang, Hsinchu (TW); Yin-Ju Yang, Hsinchu (TW); Shu-Chen Li, Taipei County (TW)

(73) Assignee: Industrial Technology Research Institute, Hsin Chu Hsien (TW)

( * ) Notice: Subject to any disclaimer, the term of this patent is extended or adjusted under 35 U.S.C. 154(b) by 0 days.

(21) Appl. No.: 14/094,951

(22) Filed: Dec. 3, 2013

(65) Prior Publication Data

US 2014/0094544 A1    Apr. 3, 2014

Related U.S. Application Data

(60) Division of application No. 13/329,670, filed on Dec. 19, 2011, now Pat. No. 8,623,944, which is a continuation of application No. 12/216,927, filed on Jul. 14, 2008, now abandoned.

(30) Foreign Application Priority Data

Dec. 11, 2007  (TW) ................ 96147159 A

(51) Int. Cl.
| | | |
|---|---|---|
| *C08L 89/00* | (2006.01) | |
| *C09J 167/04* | (2006.01) | |
| *C08K 5/00* | (2006.01) | |
| *C08L 5/00* | (2006.01) | |
| *C08L 5/10* | (2006.01) | |
| *C08L 23/04* | (2006.01) | |
| *C08L 67/00* | (2006.01) | |
| *C08L 67/02* | (2006.01) | |
| *C08L 67/03* | (2006.01) | |
| *C08L 67/04* | (2006.01) | |
| *C08L 89/06* | (2006.01) | |
| *C09J 167/02* | (2006.01) | |

(52) U.S. Cl.
CPC ........... *C09J 167/04* (2013.01); *C08K 5/0016* (2013.01); *C08L 5/00* (2013.01); *C08L 5/10* (2013.01); *C08L 23/04* (2013.01); *C08L 67/00* (2013.01); *C08L 67/02* (2013.01); *C08L 67/03* (2013.01); *C08L 67/04* (2013.01); *C08L 89/00* (2013.01); *C08L 89/06* (2013.01); *C09J 167/02* (2013.01); *C08L 2201/06* (2013.01)
USPC .................................. 524/17; 524/22; 524/24

(58) Field of Classification Search
USPC ................................................. 524/17, 22, 24
See application file for complete search history.

(56) References Cited

U.S. PATENT DOCUMENTS

| | | |
|---|---|---|
| 5,447,966 A | 9/1995 | Hermes et al. |
| 5,710,190 A | 1/1998 | Jane et al. |
| 5,753,364 A | 5/1998 | Rutherford et al. |
| 5,902,262 A | 5/1999 | Bastioli et al. |
| 5,939,467 A | 8/1999 | Wnuk et al. |
| 6,284,838 B1 | 9/2001 | Silbiger |
| 6,573,340 B1 | 6/2003 | Khemani et al. |
| 6,905,759 B2 | 6/2005 | Topolkaraev et al. |
| 6,987,138 B2 | 1/2006 | Tokiwa et al. |
| 7,160,977 B2 | 1/2007 | Hale et al. |
| 2005/0019294 A1 | 1/2005 | Modliszewski et al. |
| 2005/0163824 A1 | 7/2005 | Ayers et al. |
| 2009/0110713 A1 | 4/2009 | Lim et al. |

FOREIGN PATENT DOCUMENTS

| | | |
|---|---|---|
| EP | 0251476 A1 | 1/1988 |
| EP | 0722705 A2 | 7/1996 |
| FR | 2732687 A1 | 10/1996 |
| GB | 1532783 A | 11/1978 |
| GB | 2374343 A | 10/2002 |
| JP | 51073143 A | 6/1976 |
| JP | 8333514 A | 12/1996 |
| KR | 20020045227 A | 6/2002 |
| WO | 2007095711 A1 | 8/2007 |

*Primary Examiner* — Peter D Mulcahy
(74) *Attorney, Agent, or Firm* — Bacon & Thomas, PLLC

(57) ABSTRACT

The present embodiment relates to a Plasticizer, which is fabricated by mixing monomers of biodegradable polymer with bio-molecules subsequently to deal the mixture with thermal treatment. The Biodegradable material comprising the Plasticizer has high melt index which is contributive for the processing of thermal processing, and the microwave-tolerance and water-resistance of the material makes the material suitable for food packaging.

9 Claims, 1 Drawing Sheet

Fig. 1
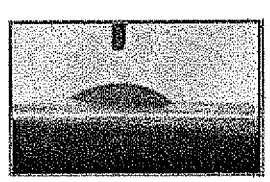 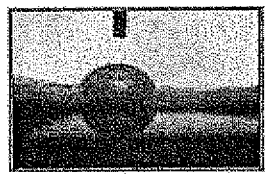 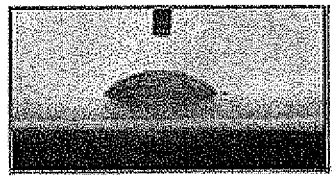
Fig. 2A          Fig. 2B          Fig. 2C

PLASTICIZER, A BIODEGRADABLE MATERIAL COMPRISING THE PLASTICIZER AND APPLICATION THEREOF

CROSS REFERENCES TO THE RELATED APPLICATIONS

This is a divisional application of U.S. application Ser. No. 13/329,670, filed on Dec. 19, 2011, which is a continuation application of U.S. application Ser. No. 12/216,927, filed on Jul. 14, 2008, which claims priority to Taiwan Application No. 96147159, filed on Dec. 11, 2007, the entire contents of which are incorporated herein by reference.

TECHNICAL FIELD

The technical field relates to a biodegradable material, especially a biodegradable material containing a plasticizer.

BACKGROUND

The rise of plastic packaging material closely relates to the change of general lifestyle. The use of light, convenient packaging to facilitate food storage and transportation, as well as increasing the shelf life of food has become very important due to the pressure from high population growth rate and food shortage. Although plastic packaging at present can satisfy these demand, the consumption of plastic has exceeded 160 million tons annually, within which 35% is used as packaging material. The treatment of waste from the packaging material imposes huge impact on the environment, so the recycling of plastic and the study of degradable plastic have become more and more important.

Biodegradable material has been generally defined as a material under sufficient water, oxygen, and suitable nutrients and temperature being able to decompose into carbon dioxide and water by microbes. Biodegradable material is a new type of polymer, which is characterized by the self-decomposition when its function completes. The bonding between these polymers decomposes into environmentally friendly compositions through biological processes. Biodegradable material is more friendly to the environment than conventional material. Generally speaking, the treatment and recycling for plastics used in disposable applications after use are not economic and impose greater impact on the environment. The treatment of contaminated plastics at present is nothing more than combustion or landfill, which invisibly increases the loading to the environment. Therefore, the development of biodegradable material has become a high-profile issue. Depending on the source of the material, biodegradable material can be divided into four categories: (1) biodegradable material based on polylactic acid; (2) biodegradable material based on polyester; (3) biodegradable material based on starch; and (4) biodegradable material based on polycaprolactone. Other natural materials such as soybean are also under development continually.

Although the biodegradable material at present is environmentally friendly, the structure of such material is hard to be modified, and their products after different kinds of fabrication processes have disadvantages of fragility, low heat-resistance, insufficient viscosity and so on. Therefore, the application of biodegradable materials is greatly limited, and the marketing products can only be used at low temperature. In view of this, the emphasis of future market demand will be focused on the environmentally friendly formula having increased functionalities of heat-tolerance, tenacity, viscosity and so on.

SUMMARY

In view of the disadvantages in the known art, the object of the present embodiment is to provide a plasticizer added in biodegradable material, to improve the property of the biodegradable material, and facilitate the follow-up processes.

Another object of the present embodiment is to provide a biodegradable material having excellent properties. By the use of plasticizer, biodegradable materials with appropriate tenacity, impact-tolerance, high adhesion and ductility can be obtained.

Yet another object of the present embodiment is to provide a surface-covering material for paper, wood, plastic or metal substrate to improve the water-resistant, oil-resistant, microwave-tolerant and anti-freezing properties of the substrate.

Yet another object of the present embodiment is to provide a adhesion material for paper, wood, plastic or metal substrate to adhere two substrates.

To achieve the above objects, the plasticizer for the biodegradable material of the present embodiment comprises 100 parts by weight of a bio-molecule and 0.1 to 1000 parts by weight of a monomer of biodegradable polymer, wherein the bio-molecule and the monomer of biodegradable polymer are thermal-treated at 50 to 160° C. after mixing.

The present embodiment also includes a use of plasticizer for adjusting the tenacity and/or impact-tolerance and/or ductility and/or adhesion of biodegradable material, wherein the plasticizer comprises 100 parts by weight of a bio-molecule and 0.1 to 1000 parts by weight of a monomer or oligomer of biodegradable polymer, water or mixtures thereof, and the plasticizer is thermal-treated at 50 to 160° C.

The present invention includes a biodegradable material precursor, which comprises 100 parts by weight of a biodegradable polymer and 0.1 to 50 parts by weight of a plasticizer; wherein the plasticizer is made up of 100 parts by weight of a bio-molecule and 0.1 to 1000 parts by weight of a monomer or oligomer of biodegradable polymer, water or mixtures thereof; wherein the plasticizer is thermal-treated at 50 to 160° C.

The present embodiment also includes a biodegradable material (a biodegradable product), which is obtained by thermal-treating the above-mentioned biodegradable material precursor.

The biodegradable product of the present invention can adhere two objects by thermal-compressing, and therefore the present invention also provides a adhesion material, which is obtained by thermal-treating the above-mentioned biodegradable material precursor. The adhesion material is characterized by adhering two surfaces through thermal-compressing.

BRIEF DESCRIPTION OF THE DRAWINGS

FIG. 1. is an image of a thin film formed by laminating the biodegradable material of the present embodiment.

FIG. 2A. is an image of water drops on the surface of glassine paper.

FIG. 2B. is an image of water drops on glassine paper having the biodegradable material of the present embodiment on its surface.

FIG. 2C. is an image of water drops on glassine paper having low density polyethylene thin film on its surface.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The biodegradable plasticizer of the present embodiment comprises 100 parts by weight of a bio-molecule and 0.1 to 1000 parts by weight of a precursor monomer or oligomer of the biodegradable polymer, water or mixtures thereof, wherein the bio-molecule and the precursor monomer or oligomer of the biodegradable polymer, water and mixtures thereof are thermal-treated at 50 to 160° C. after mixing. In a preferred embodiment, the mixing ratio of the bio-molecule and the precursor monomer of the biodegradable polymer is 100 parts by weight of the bio-molecule, and 0.1 to 500 parts by weight of the precursor monomer or oligomer of the biodegradable polymer, water or mixtures thereof. In a more preferred embodiment, the mixing ratio of the bio-molecule and the precursor monomer of the biodegradable polymer is 100 parts by weight of the bio-molecule and 0.1 to 200 parts by weight of the precursor monomer or oligomer of the biodegradable polymer, water or mixtures thereof.

The "bio-molecule" mentioned in the present embodiment refers to a biodegradable or bio-compatible material, such as protein or other materials forming the connective tissues or bones of animals or plants (such as agar, hyaluronic acid, chitosan or vegetable gelatin, for example hydroxypropypethyl cellulose).

Preferably, the protein suitable for the plasticizer of the present embodiment is animal gelatin or animal collagen, wherein the animal gelatin mentioned in the present embodiment refers to proteins from which the source includes beef bones, beef skin or pig skin, whose main composition is the protein after the hydrolysis of collagen.

Furthermore, the precursor monomer of the biodegradable polymer in the plasticizer of the present embodiment refers to a precursor monomer, from which the polymer formed by polymerization reaction is biodegradable. In other words, the precursor monomer of the biodegradable polymer can be used in the plasticizer of the present embodiment. There are many biodegradable polymers in the known art, and the one more suitable for the present technique is biodegradable polyester or biodegradable polyethylene or copolymers thereof, wherein the biodegradable polyester includes polygiycolic acid, polylactic acid, polycaprolactone, polyhydroxybutyrate, polyhydroxyvalerate, polyhydroxyvaleric acid or copolymers thereof, and the biodegradable polyethylene includes polyvinylacetate, poly(butylenes succinate), polyvinyl alcohol, poly-p-dioxanone or copolymers thereof.

The plasticizer of the present embodiment is formed by mixing the bio-molecule and the precursor monomer of the biodegradable polymer at a required ratio, then thermal-treating the mixture, wherein the temperature for thermal-treating is 50 to 160° C., and 80 to 130° C. in a preferred embodiment.

In some embodiments, the precursor monomer of the biodegradable polymer of the present embodiment can be replaced by oligomer or water, i.e. the plasticizer of the present embodiment comprises bio-molecule and water. In these embodiments, the bio-molecule solution is used to adjust the tenacity and/or impact-tolerance and/or adhesion and/or ductility of the biodegradable polymer. The bio-molecule solution used as plasticizer is composed of 100 parts by weight of a bio-molecule and 0.1 to 1000 parts by weight of water, wherein some parts of the water can be replaced by the precursor monomer of the biodegradable polymer. The same as the embodiments using the precursor monomer of the biodegradable polymer, the bio-molecule solution is thermal-treated at 50 to 160° C. after mixing, and preferably at 80 to 130° C. In this embodiment, the definition of the bio-molecule is the same as mentioned above. From the above description for the composition of the plasticizer, the use of plasticizer is to adjust the tenacity and/or impact-tolerance and/or adhesion and/or ductility of a biodegradable polymer, wherein the plasticizer is added to the biodegradable polymer, and then the tenacity and/or impact-tolerance and/or adhesion and/or ductility of the biodegradable polymer can be changed after fabrication as expected.

Therefore, the biodegradable material precursor of the present embodiment comprises 100 parts by weight of a biodegradable polymer and 0.1 to 50 parts by weight of a plasticizer, wherein the plasticizer comprises 100 parts by weight of a bio-molecule and 0.1 to 1000 parts by weight of a precursor monomer or oligomer of the biodegradable polymer, water or mixtures thereof, and the plasticizer is thermal-treated at 50 to 160° C. The definitions of bio-molecule and biodegradable polymer are the same as mentioned above. Preferably, the biodegradable material precursor is formed by mixing 100 parts by weight of a biodegradable polymer and 0.1 to 10 parts by weight of a plasticizer, wherein the preferred temperature for thermal-treating the plasticizer is 80 to 130° C.

The biodegradable material precursor of the present embodiment can be thermal-treated to form different types of biodegradable material as needed (ex: container or surface thin film), i.e. the present embodiment provides a biodegradable material, which is obtained by thermal-treating the above-mentioned biodegradable material precursor.

The thermal-treating process mentioned in the present embodiment includes polymer techniques which are used to produce a polymer, such as injection-molding, extrusion-molding, roll-coating, laminating or foaming. The molding temperature of the biodegradable material formed by the biodegradable material precursor of the present embodiment is 160 to 280° C., and preferably 190 to 250° C.

It can be easily understood by the skilled in the art that biodegradable materials with different tenacity, impact-resistance, adhesion and ductility can be obtained by adjusting the composition of plasticizer and the ratio of plasticizer to biodegradable polymer as needed. For example, the required properties for a biodegradable material used as a container, a coating film or electronic plastics are different, and that can be achieved by changing the composition of the precursor.

During the development of the present embodiment, the biodegradable material can also be used as a adhesive, which is to place the biodegradable material between the surface of two objects needed to be adhered, and use thermal-compressing to produce the adhesive property of the biodegradable material, then adhere these two objects.

Therefore, the biodegradable material of the present embodiment is also a adhesion material, which is used to adhere two objects, wherein the material of these two objects can be the same or different, including paper, wood, plastic or metal.

Specifically, it is known from the above description for the biodegradable material precursor that the flowability of the biodegradable material precursor can be adjusted by changing the amount of the plasticizer added, and therefore the biodegradable material with high and low contents of plasticizer can be used in different fields appropriately, and can be diluted by adding solvents (especially water). Generally speaking, the biodegradable material with low flowability (i.e. high viscosity) is more suitable to be used as a adhesive.

The advantages of the present embodiment are further depicted with the illustration of examples, which however should not be construed as a limitation on the scope of claims.

EXAMPLE 1

Preparation of Plasticizer

The present embodiment includes the preparation of four plasticizers, which is described as below:

Case 1

5 g vegetable gelatin (vegetable hard shell capsule #0 produced by Dah Feng Capsule Industry Co., Ltd.) was mixed with 5 g water, then placed in an environment of 80° C. for 1 hour to obtain the plasticizer of the present embodiment (A001).

Case 2

5 g vegetable gelatin (vegetable hard shell capsule #0 produced by Dah Feng Capsule Industry Co., Ltd.) was mixed with 5 g lactic acid monomer, then placed in an environment of 130° C. for 4 hours to obtain the plasticizer of the present embodiment (A002).

Case 3

5 g animal gelatin (gelatin 260B sold by Buildmore Enterprise Co., Ltd.) was mixed with 5 g water, then placed in an environment of 80° C. for 1 hour to obtain the plasticizer of the present embodiment (A003).

Case 4

5 g animal gelatin (gelatin 260B sold by Buildmore Enterprise Co., Ltd.) was mixed with 5 g lactic acid monomer, then placed in an environment of 130° C. for 4 hours to obtain the plasticizer of the present embodiment (A004).

EXAMPLE 2

Preparation of Biodegradable Product

The present embodiment includes the preparation of four biodegradable products, which is described as below:

Case 1

10 g plasticizer of example 1 (A001) was added in 500 g polylactic acid (PLA), then underwent laminating process at the 190° C. to obtain a biodegradable product as a thin film (PLA/A001), as shown in FIG. 1.

Case 2

10 g plasticizer of example 1 (A002) was added in 500 g polylactic acid (PLA), then underwent laminating process at the 250° C. to obtain a biodegradable product as a thin film (PLA/A002).

Case 3

10 g plasticizer of example 1 (A003) was added in 500 g polylactic acid (PLA), then underwent laminating process at the 250° C. to obtain a biodegradable product as a thin film (PLA/A003).

Case 4

10 g plasticizer of example 1 (A004) was added in 500 g polylactic acid (PLA), then underwent laminating process at the 190° C. to obtain a biodegradable product as a thin film (PLA/A004).

EXAMPLE 3

The Properties of Biodegradable Material

The present embodiment includes some testing results for the properties of biodegradable material to illustrate the efficacy of the present embodiment.

Melt Index

The melt index of PLA is 4 to 8. After adding the plasticizer of the present embodiment, the melt index of PLA is raised up to 32 to 79 (testing values of four biodegradable materials from example 2). The increasing of melt index shows that the addition of plasticizer of the present embodiment is contributive to the fabrication of PLA, such as the laminating in example 2.

Contact Angle

The contact angle of the present embodiment was tested by measuring the contact angle of water drops on the surface of glassine paper. Without surface modification of the glassine paper, the contact angle is 40.25° (FIG. 2A), and it is elevated to 70.89° when the surface is rod-coated to form the biodegradable material PLA/A004 (FIG. 2B). In the data of control study, the contact angle of a glassine paper coated with low density polyethylene (LDPE) is 60.93° (FIG. 2C). It is known from the results of contact angle that the biodegradable material of the present embodiment can increase the hydrophobicity of a surface.

Temperature Test

Biodegradable material PLA/A004 was formed and coated on the surface of a biodegradable food container (paper) as a thin film, then microwaved for 3 minutes at a high microwave power (750 W), and no peeling-off of the thin film was observed. Afterward, water was added to 80% confluence of the container after microwave, then placed in a freezer for 4 hours, defrosted at room temperature, and no peeling-off of the thin film was observed. Afterward, the film was peeled off the paper surface, and some fiber residue was observed on the paper surface, which shows that the adhesion between the film and the paper remain unchanged before and after the test.

Adhesion Test

Biodegradable material PLA/A004 was combined and sandwiched between paper and wood (paper/biodegradable material/wood), and then underwent adhesion test based on the testing standard JIS K5400. In the control case, paper/LDPE/wood was tested under the same condition. The adhesion test result for LDPE is 4, and 8 for the biodegradable material of the present embodiment, which shows that the thin film formed by the biodegradable material of the present embodiment has good adhesion with other natural biodegradable materials.

Glass Transition Temperature (Tg), Crystallization Temperature (Tc), Melting Temperature (Tm), Decomposition Temperature (Td) and Melt Index (MI)

The polymer properties of biodegradable material in example 2 are compared with that of PLA in control case, and the results are shown in below table.

TABLE 1

| | property | | | | |
|---|---|---|---|---|---|
| polymer | Tg | Tc | Tm | Td | MI |
| PLA | 54.7 | 120.4 | 150.3 | 329.6 | 2~4 |
| PLA/A001 | 50.3 | 109.9 | 147/153.0 | 352.4 | 24.6 |
| PLA/A002 | 52.0 | 108.7 | 147/153.0 | 352.1 | 32.2 |
| PLA/A003 | 48.2 | 104.6 | 142.0/151.2 | 346.4 | 36.1 |
| PLA/A004 | 48.1 | 119.8 | 149.3/152.8 | 346.8 | 79.8 |

It is known from the testing data in table 1, the plasticizer of the present embodiment greatly increases the melt index of PLA without changing other polymer properties, and facilitate the fabrication of biodegradable polymers such as PLA.

In summary, the plasticizer of the present embodiment increases the tenacity, oil-resistance, water-resistance and microwave-tolerance of the biodegradable polymer, and the adhesion property is also better than conventional food packaging. and no peeling-off occurs under freezing condition. The plasticizer of the present embodiment is contributive to the replacement of plastic packaging by biodegradable packaging, and the production of waste can be reduced by using this environmentally friendly formula combined with plastic or metal substrates.

OTHER EXAMPLES

All technical features disclosed in this specification can be combined with other processes, and every single technical feature can be selectively substituted by features the same with, equal to, or similar to the aimed features. Therefore, each technical feature disclosed in this specification is merely an example equal to or similar to the aimed features.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. A biodegradable material precursor, consisting of:
   100 parts by weight of a biodegradable polymer; and
   0.1 to 50 parts by weight of a plasticizer;
   wherein said plasticizer comprises 100 parts by weight of a bio-molecule and 0.1 to 1000 parts by weight of a precursor monomer or oligomer of the biodegradable polymer, water or mixtures thereof; said bio-molecule and said precursor monomer or oligomer of the biodegradable polymer, water or the mixture thereof is thermal-treated at 50 to 160° C. after mixing; said bio-molecule is selected from the group consisting of vegetable gelatin, animal protein, agar, chitosan, hyaluronic acid or mixtures thereof; and said biodegradable polymer is selected from the group consisting of biodegradable polyester, biodegradable polyethylene or copolymers thereof.

2. The biodegradable material precursor according to claim 1, consisting of:
   100 parts by weight of a biodegradable polymer; and
   0.1 to 20 parts by weight of a plasticizer;
   wherein said plasticizer comprises 100 parts by weight of a bio-molecule and 0.1 to 500 parts by weight of a monomer or oligomer of biodegradable polymer, water or mixtures thereof;
   said bio-molecule and said precursor monomer or oligomer of the biodegradable polymer, water or the mixture thereof is thermal-treated at 50 to 160° C.; said bio-molecule is selected from the group consisting of vegetable gelatin, animal protein, agar, chitosan, hyaluronic acid or mixtures thereof; and said biodegradable polymer is selected from the group consisting of biodegradable polyester, biodegradable polyethylene or copolymers thereof.

3. The biodegradable material precursor according to claim 1, wherein said biodegradable polymer includes polyglycolic acid, polylactic acid, polycaprolactone, polyhydroxybutyrate, polyhydroxyvalerate, polyhydroxyvaleratic acid, polyvinylacetate, poly(butylenes succinate), polyvinyl alcohol, poly-p-dioxanone or copolymers thereof.

4. The biodegradable material precursor according to claim 1, wherein the temperature of said thermal-treating is 80 to 130° C.

5. The biodegradable material precursor according to claim 2, wherein the biomolecule is a vegetable gelatin and the monomer is lactic acid and the biodegradable polymer is polylactic acid.

6. The biodegradable material precursor according to claim 2, wherein the animal protein is animal gelatin and the monomer is lactic acid and the biodegradable polymer is polylactic acid.

7. A method for adhering objects, comprising:
   thermal-treating said biodegradable material precursor according to claim 1 to obtain a biodegradable material, and
   placing said biodegradable material between the surface of each said objects as an adhesion material.

8. The method according to claim 7, wherein the material of said surface of each said objects are the same or different.

9. The method according to claim 8, wherein the material of said surface of each said objects includes paper, wood or metal.

* * * * *